United States Patent [19]

Tsuchiya et al.

[11] Patent Number: 4,665,454
[45] Date of Patent: May 12, 1987

[54] DATA TRANSFER APPARATUS FOR USE WITH A MAGNETIC DISK CARTRIDGE

[75] Inventors: Isamu Tsuchiya, Oume; Toshio Ihana, Tokorozawa, both of Japan

[73] Assignee: Teac Corporation, Tokyo, Japan

[21] Appl. No.: 754,031

[22] Filed: Jul. 9, 1985

[30] Foreign Application Priority Data

Jul. 17, 1984 [JP] Japan ................. 59-148224

[51] Int. Cl.⁴ .............. G11B 5/016; G11B 17/02; G11B 21/14; G11B 21/22
[52] U.S. Cl. ........................... 360/97; 360/99; 360/105
[58] Field of Search ............ 360/97, 99, 105

[56] References Cited

U.S. PATENT DOCUMENTS

| | | | |
|---|---|---|---|
| 4,146,912 | 3/1979 | Kukreja | 360/99 |
| 4,179,718 | 12/1979 | Rolph | 360/99 |
| 4,193,102 | 3/1980 | Beuch et al. | 360/99 |
| 4,360,844 | 11/1982 | Maiers | 360/99 |
| 4,415,940 | 11/1983 | Becker | 360/99 |
| 4,539,614 | 9/1985 | Thompson | 360/99 |

FOREIGN PATENT DOCUMENTS 58-77080  5/1983  Japan .

*Primary Examiner*—Robert S. Tupper
*Attorney, Agent, or Firm*—Woodcock Washburn Kurtz Mackiewicz & Norris

[57] ABSTRACT

A flexible magnetic disk, rotatably housed in an apertured envelope to make up a disk cartridge, is loaded through an entrance slot in the housing of the apparatus to a preassigned position for data transfer with a pair of transducer heads on its opposite sides. Upon subsequent activation of a clamp actuating mechanism, the magnetic disk is clamped for rotation and, at the same time, is caught between the transducer heads for data transfer therewith. In order to avoid the direct contact of the two transducer heads as a result of the user's tampering with the clamp actuating mechanism when the disk cartridge is not loaded in the apparatus, a clamp inhibit mechanism is provided for preventing the operation of the clamp actuating mechanism when the disk cartridge is not loaded. The clamp inhibit mechanism includes a detent which is activated by the disk cartridge inserted in the entrance slot for allowing the operation of the clamp actuating mechanism. Upon subsequent activation of the clamp actuating mechanism, the detent is thereby reactivated to move out of contact with the loaded disk cartridge, so that the detent does not in any way interferes with the rotation of the magnetic disk.

8 Claims, 17 Drawing Figures

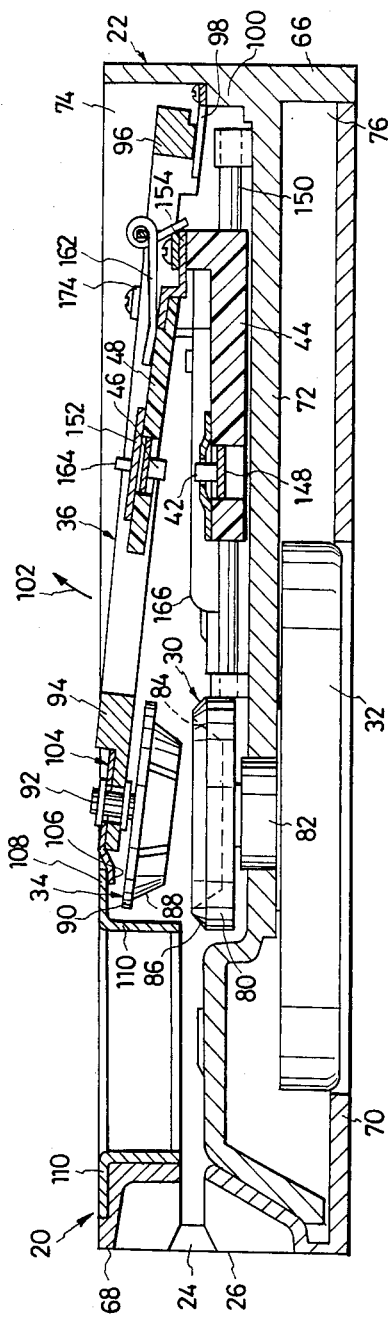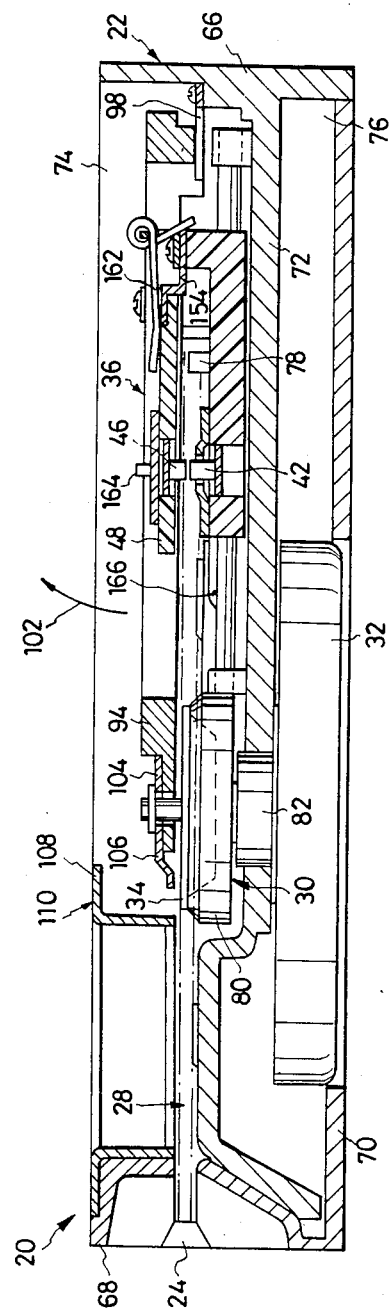

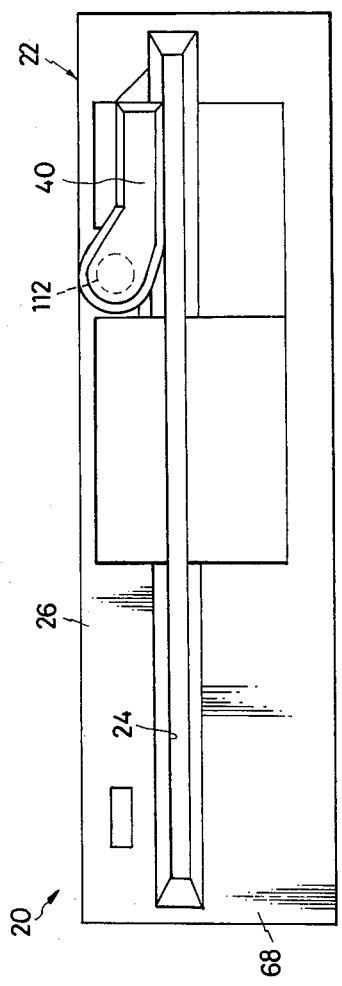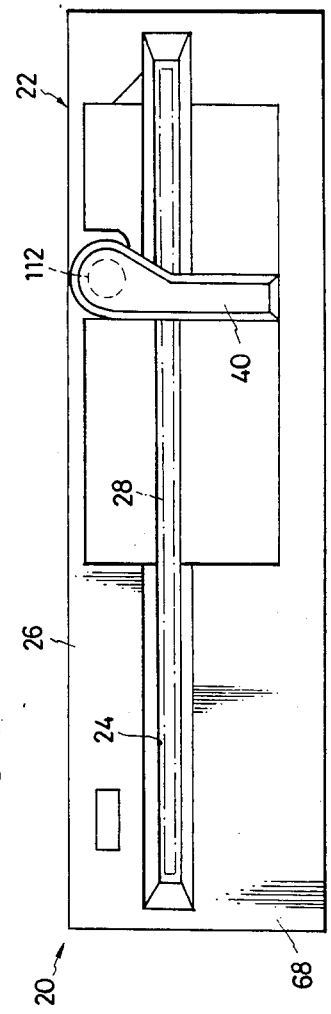
FIG.4
FIG.5

DATA TRANSFER APPARATUS FOR USE WITH A MAGNETIC DISK CARTRIDGE

BACKGROUND OF THE INVENTION

Our invention relates to an apparatus for data transfer with disklike record media, and more specifically to an apparatus for the recording and/or reproduction of coded data with use of interchangeable flexible magnetic disks, now commonly referred to as floppy disks, that are housed in protective envelopes or jackets to make up disk cartridges. Still more specifically, out invention deals with improvement in such a data transfer apparatus of the class having a pair of magnetic heads for data transducing contact with the opposite faces of the magnetic disk.

Flexible magnetic disks may be described as being either single or double sided depending upon whether one or both of its opposite faces are used for data storage. A data transfer apparatus for use with double sided disks or disk cartridges has a pair of magnetic transducer heads. The first of these heads is substantially fixed in a direction normal to the plane of the magnetic disk. The second transducer head is typically mounted on a pivotal head arm for movement therewith into and out of data transfer contact with the magnetic disk. A solenoid has been a familiar example of actuator for such pivotal motion of the head arm. An advantage of this prior art construction is that the head arm can be readily solenoid actuated to move the second transducer head away the magnetic disk for the travel of both heads in its radial direction for track to track accessing, thereby avoiding damage or wear of the disk due to friction that would otherwise be caused by sliding engagement of the disk with both transducer heads. Offsetting this advantage, however, are the longer access time and the higher cost of the apparatus because of the use of the solenoid.

These weaknesses are absent from the data transfer apparatus described and claimed in Japanese Laid Open Patent Application No. 58-77080 filed by the assignee of the instant application and laid open to public inspection on May 10, 1983. This prior art device teaches to interlock the second transducer head with the disk clamp mechanism and hence to dispense with the solenoid. The second transducer head is sprung into data transfer contact with the magnetic disk as the clamp mechanism is hand actuated to clamp the disk against the drive hub assembly following the loading of the disk cartridge into the apparatus.

This solution has proved not truly satisfactory, however. The user may inadvertently actuate the clamp mechanism when no disk cartridge is loaded in the apparatus. Then the second transducer head, mounted on the pivotal head arm, will be spring energized into direct contact with the first head. Since the opposed faces of both transducer heads have a smooth, mirror-like finish to offer a minimum friction to the magnetic disk, they will stick together upon direct contact with each other, so firmly that they may not easily come apart. Such direct contact of the transducer heads under spring pressure may also result in the destruction of their gimbal supports.

An obvious remedy for this problem is to lock against operation the clamp actuating means such as a hand lever when no disk cartridge is loaded. The clamp actuating means may be unlocked in response to the insertion of a disk cartridge in the entrance slot. The use of mechanical, rather than electrical, means is preferable in thus unlocking the clamp actuating means for the simpler construction and lower cost of the apparatus. However, should the locking means be left in contact with the disk cartridge after having been tripped thereby, such means would exert a pressure on the magnetic disk via its envelope. The thus increased frictional resistance against the rotation of the magnetic disk would might result in a decrease in the speed of disk rotation. The magnetic disk might also partly deflect under pressure from the locking means, giving rise to fluctuations in the pressure of contact between the disk and the transducer heads. All in all, the proper data transfer between disk and heads might become impossible.

SUMMARY OF THE INVENTION

We have hereby found a truly satisfactory solution to the problem of how to avoid, in a data transfer apparatus of the kind defined, the direct contact of the pair of magnetic transducer heads with each other. In devising this solution, moreover, we have eliminated the exertion of the noted undesirable force on the loaded disk cartridge, thereby assuring the smoooth rotation of the magnetic disk in proper contact with the pair of magnetic transducer heads.

Stated in brief, the data transfer apparatus in accordance with out invention includes a housing having an entrance opening for the insertion and withdrawal of a magnetic disk cartridge to and from a predetermined data transfer position therein. Mounted within the housing are a drive hub assembly and a clamp assembly which are disposed on the opposite sides of the disk cartridge in the data transfer position. The clamp assembly is actuable by a clamp actuating mechanism between an unclamping position, where the clamp assembly is away from the drive hub assembly to allow the insertion and withdrawal of the disk cartridge into and from the housing, and a clamping position where the clamp assembly engages between itself and the drive hub assembly the magnetic disk of the disk cartridge in the data transfer position. A first transducer head is mounted directly on a carriage thereby to be transported radially of the magnetic disk of the disk cartridge being held in the data transfer position. A second transducer head is mounted on a head arm which in turn is pivotally mounted on the carriage for movement between a retracted position, where the second transducer head is away from the disk cartridge in the data transfer position, and a working position where the second transducer head urges the magnetic disk of the disk cartridge against the first transducer head for the establishment of data transfer contact of the magnetic disk with both first and second transducer heads. The head arm is associated with the clamp actuating mechanism so as to be held in the retracted position when the clamp assembly is in the unclamping position and to be held in the working position when the clamp assembly is in the clamping position. Also included is a clamp inhibit mechanism for including a detent for preventing the clamp actuating mechanism for actuating the clamp assembly from the unclamping to the clamping position when the disk cartridge is not loaded in the apparatus. Upon insertion of the disk cartridge in the entrance opening, the detent of the clamp inhibit mechanism is thereby activated for allowing the clamp actuating mechanism to actuate the clamp assembly from the unclamping to the clamping position. Further, in response to this actuation of the clamp assembly, the detent is displaced out of contact with the loaded and clamped disk cartridge.

We have thus redesigned the data transfer apparatus so that the second transducer head stays away from the first transducer head despite the user's possible tampering with the clamp actuating mechanism when the apparatus is not loaded with a disk cartridge.

In one of the typical embodiments of our invention, as will be disclosed presently, the clamp actuating mechanism has a clamp knob or lever pivotally mounted on the front face of the apparatus for manual activation of the clamp assembly between the clamping and unclamping positions. The detent of the clamp inhibit mechanism functions to lock the clamp knob against rotation in the clamping direction when no disk cartridge is loaded in the apparatus. Tripped by the disk cartridge inserted in the entrance opening, the detent is further displaced out of contact with the disk cartridge as the clamp knob is subsequently manipulated to clamp the disk cartridge in the data transfer position. This arrangement is preferred because of the simple construction and reliable operation of the clamp inhibit mechanism.

The above and other features and advantages of our invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 2 is a vertical section through the data transfer apparatus, taken along the line II—II in FIG. 1, the apparatus being herein shown with its clamp assembly held in the unclamping position and with the pair of magnetic transducer heads held away from each other;

FIG. 3 is a view similar to FIG. 2 except that the data transfer apparatus is shown with its clamp assembly actuated to the clamping position for clamping the loaded disk cartridge and with the pair of magnetic transducer head in data transfer contact with the magnetic disk of the disk cartridge;

FIG. 4 is a front elevation of the data transfer apparatus, showing the clamp knob on the front face of the apparatus in a disengaging position to hold the clamp assembly away from the drive hub assembly as in FIG. 2;

FIG. 5 is a view similar to FIG. 4 except that the clamp knob is shown in an engaging position for clamping the magnetic disk cartridge as in FIG. 3;

DESCRIPTION OF THE PREFERRED EMBODIMENTS

General

Figure 6:
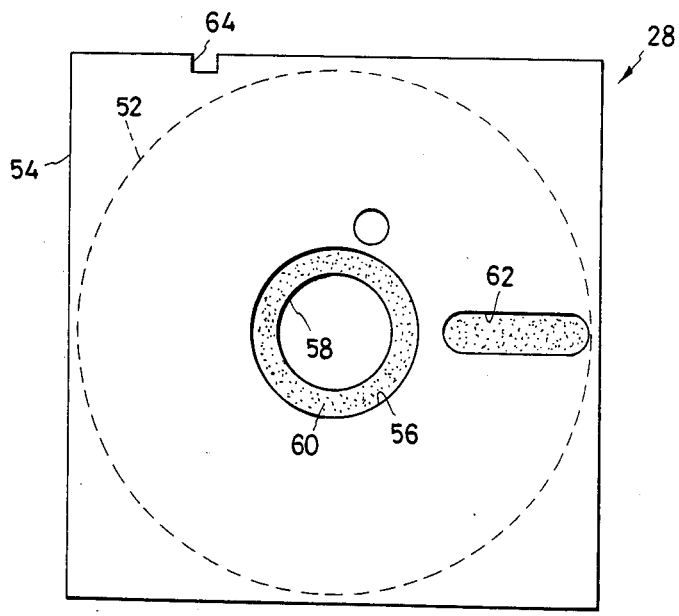
FIG. 6 is a plan of the flexible magnetic disk cartridge for use with the data transfer apparatus of FIGS. 1 through 5, the disk cartridge being shown on a somewhat reduced scale in comparison with the size of the data transfer apparatus as given in FIGS. 1 through 5.

The data transfer apparatus in accordance with our invention is shown in FIGS. 1 through 5 of the above drawings as adapted for use with the double sided flexible magnetic disk cartridge of FIG. 6. Generally designated 20, the data transfer apparatus broadly comprises:

1. A generally boxlike housing 22 accommodating various working parts of the apparatus hereinafter set forth and having an entrance slot or opening 24. FIGS. 2 through 5, formed in its front face 26 for the insertion and withdrawal of the flexible magnetic disk cartridge 28 of FIG. 6.

2. A drive hub assembly 30, FIGS. 2 and 3, mounted within the housing 22 and driven by an electric disk drive motor 32 for imparting rotation to the flexible magnetic disk of the disk cartridge 28 in a preasigned data transfer position within the housing.

3. A clamp assembly 34 disposed opposite the drive hub assembly 30 and herein shown mounted on a pivotal clamp arm 36 for movement into and out of clamping engagement of the magnetic disk of the disk cartridge 28 against the drive hub assembly.

4. A clamp actuating mechanism 38, FIG. 1, including a clamp knob or lever 40, FIGS. 1, 4 and 5, for manually activating the clamp assembly 34 into and out of clamping engagement with the drive hub assembly 30.

5. A first or lower magnetic transducer head 42, FIGS. 2 and 3, disposed under the disk cartridge 28 being held in the data transfer position for data transfer contact with the lower face of the magnetic disk and mounted directly on a carriage 44 thereby to be transported radially of the magnetic disk.

6. A second or upper magnetic transducer head 46, FIGS. 1 through 3, disposed over the disk cartridge 28 being held in the data transfer position, and mounted on a head arm 48, pivoted on the carriage 44, thereby to be moved into and out of data transfer contact with the upper face of the magnetic disk.

7. A clamp inhibit mechanism 50, FIG. 1, for preventing the actuation of the clamp assembly 34 into clamping engagement with the drive hub assembly 30 by the clamp actuating mechanism 38 when the disk cartridge 28 is not loaded in the apparatus 20.

We will hereinafter discuss in more detail the above listed parts and components of the data transfer apparatus 20, as well as the flexible magnetic disk cartridge 28 for use therewith, under the respective headings. The operational description of the complete apparatus will follow the detailed discussion of the individual parts and components.

Flexible Magnetic Disk Cartridge

As illustrated in FIG. 6, the disk cartridge 28 includes a flexible magnetic disk 52 that allows information to be encoded on and readable from both of its opposite faces. The magnetic disk 52 is rotatably enclosed in a generally square envelope or jacket 54 to make up the disk cartridge 28. The envelope 54 has formed in each of its opposite surfaces a central aperture 56 larger than a concentric central aperture 58 in the magnetic disk 52, thus exposing an annular portion 60 of the disk to be captured between the drive hub assembly 30 and the clamp assembly 34 as in FIG. 3. Also formed in each surface of the envelope 54 is an elliptical opening or slot 62 which exposes a radial portion of the magnetic disk 52 for accessing by either of the pair of magnetic transducer heads 42 and 46. At 64 is seen a file protect notch conventionally formed in a marginal edge portion of the envelope 54.

Housing

With reference again to FIGS. 1 through 5 the housing 22 of the data transfer apparatus 20 comprises a frame 66 and integral front 68 and bottom 70 walls, which may all be aluminum die castings and which are all combined into a generally flat, boxlike shape. The frame 66 includes a partition or platform 72, FIGS. 2 and 3, dividing the interior of the housing 22 into an upper chamber 74 and a lower chamber 76. The upper chamber 74 accommodates the drive hub assembly 30, clamp assembly 34, transducer heads 42 and 46, clamp inhibit mechanism 50, etc., whereas the lower chamber 76 has the aforesaid disk drive motor 32 mounted therein.

The front wall 68 provides the aforesaid front face 26 in which there is defined the entrance slot 24 for the insertion and withdrawal of the disk cartridge 28 to and from the data transfer position indicated by the dashed lines in FIG. 3. Inserted fully into and through the entrance slot 24, the disk cartridge 28 reaches the data transfer position on butting on a pair of stops 78 seen in both FIGS. 1 and 3.

Drive Hub Assembly

The drive hub assembly 30 is seen in both FIGS. 2 and 3. It includes a drive hub 80 therein shown mounted directly on the output shaft of the disk drive motor 32 thereby to be rotated about the same axis as the magnetic disk of the disk cartridge 28 being held in the data transfer position. The disk drive motor 32 is mounted to the partition 72 of the housing 22 via a bearing 82. The drive hub 80 has a conical socket 84 formed in its top surface for engagement with the clamp assembly 34 in a manner yet to be described. The annular top surface 86 of the drive hub 80, left around the socket 84, is intended for direct contact with the exposed annular surface 60, FIG. 6, of the magnetic disk 52 in its data transfer position.

Clamp Assembly

As shown also in FIGS. 2 and 3, the clamp assembly 34 lies on the opposite side of the disk cartridge 28, when the latter is in the data transfer position, with respect to the drive hub assembly 30. The clamp assembly 34 includes a conical collet 88, complete with a flange or shoulder 90, rotatably mounted on a spindle 92 on the free front end 94 of the clamp arm 36. Sleeved upon the spindle 92, a helical compression spring, not shown, urges the flanged collet 88 away from the clamp arm 36 and toward the drive hub assembly 30.

Figure 1:
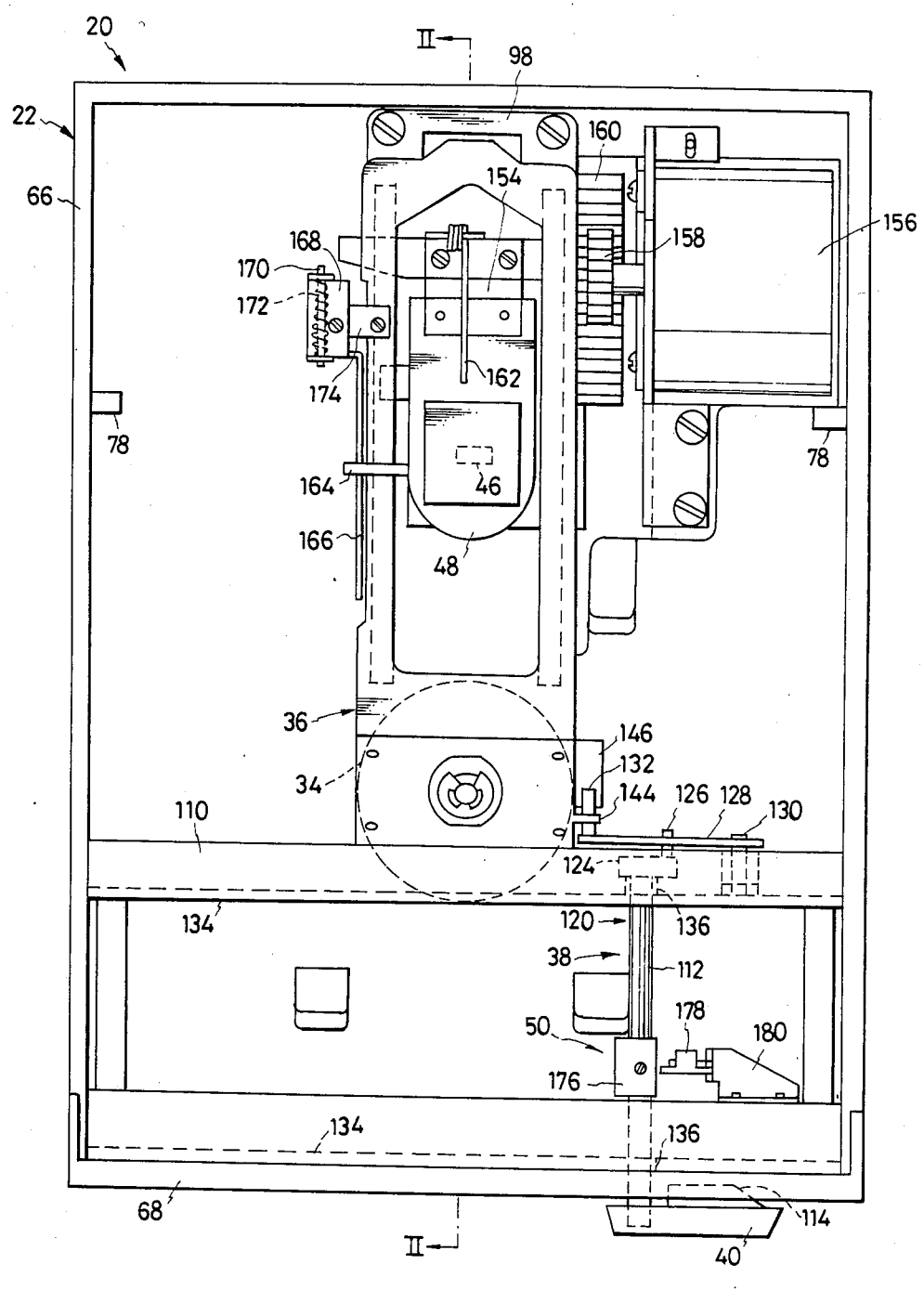
FIG. 1 is a plan of the data transfer apparatus constructed in accordance with our invention, the apparatus being shown with its top cover (not shown) removed to reveal the inner details.

As will be seen also from FIG. 1, the clamp arm 36 is supported at its rear end 96 by a cantilever spring 98 on a ledge 100 formed on the rear wall of the housing 22. So supported, the clamp arm 36 is pivotable between an unclamping position of FIG. 2 and a clamping position of FIG. 3. The cantilever spring 98 serves the purpose of biasing the clamp arm 36 from the clamping toward the unclamping position, as indicated by the arrow 102 in FIGS. 2 and 3, in addition to that of hingedly mounting the clamp arm on the ledge 100. A piece of sheet metal 104 is fastened to the free end 94 of the clamp arm 36 to provide a forward extension 106 from the clamp arm. When the clamp arm 36 is pivoted in a clockwise direction, as viewed in FIGS. 2 and 3, under the bias of the cantilever spring 98, its forward extension 106 comes into abutment against an overhanging portion 108 of a wall member 110 fastened to the frame 66, thereby limiting the clockwise turn of the clamp arm 36 in the unclamping position of FIG. 2.

When the clamp arm 36 is in the unclamping position of FIG. 2, the clamp assembly 34 is out of engagement with the drive hub assembly 30. The clamp assembly 34 is then spaced from the drive hub assembly 30 a sufficient distance to permit the insertion of the disk cartridge 28 into and through the entrance slot 24 to the data transfer position. The clamp arm 36 is to be pivoted from the unclamping to the clamping position, by the clamp actuating mechanism 38 to be detailed subsequently, following the loading of the disk cartridge 28. In the clamping position of the clamp arm 36 represented in FIG. 3, the conical collet 88 of the clamp assembly 34 becomes engaged in the correspondingly shaped socket 84 in the drive hub 80 through the central aperture 58, FIG. 6, in the magnetic disk 52 of the loaded disk cartridge 28. Also, in this clamping position, the flange 90 on the collet 88 holds the exposed annular portion 60 of the magnetic disk 52 against the annular surface 86 of the drive hub 80. Thus is the magnetic disk 52 captured fast between, and in coaxial relation with, the drive hub assembly 30 and the clamp assembly 34, so that the magnetic disk can be revolved within the envelope 54 upon rotation of the disk drive motor 32.

Clamp Actuating Mechanism

Figure 7:
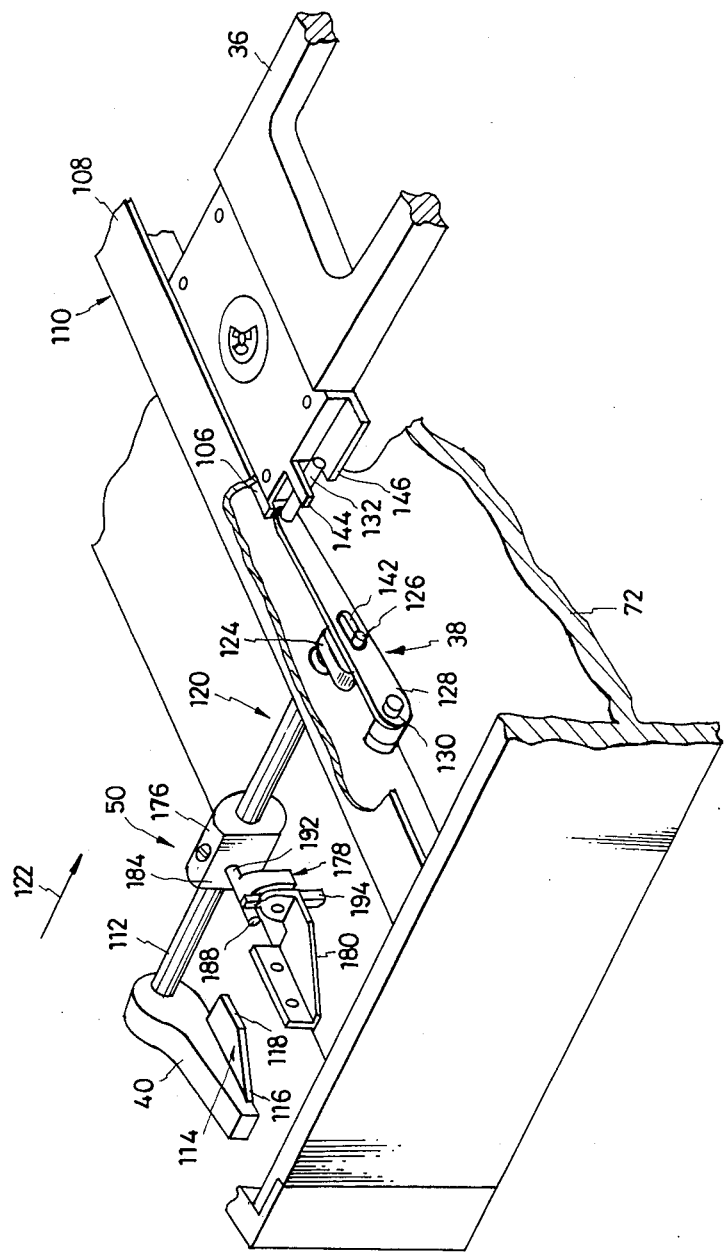
FIG. 7 is an enlarged, fragmentary perspective view, with a part shown broken away to reveal other parts, of the clamp actuating mechanism and clamp inhibit mechanism in the data transfer apparatus of FIGS. 1 through 5, with the clamp actuating mechanism being shown actuated to hold the clamp assembly in the unclamping position.
Figure 8:
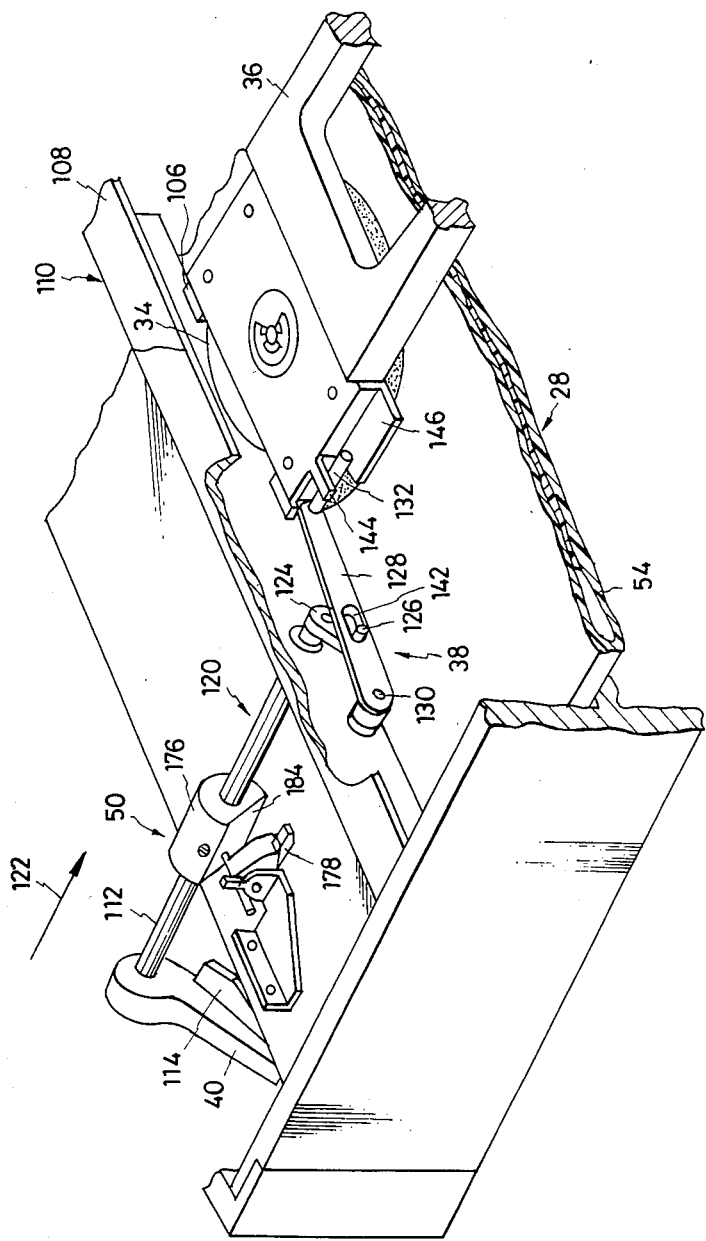
FIG. 8 is a view similar to FIG. 7 except that the clamp actuating mechanism is shown partly actuated to move the clamp assembly toward the clamping position.
Figure 9:
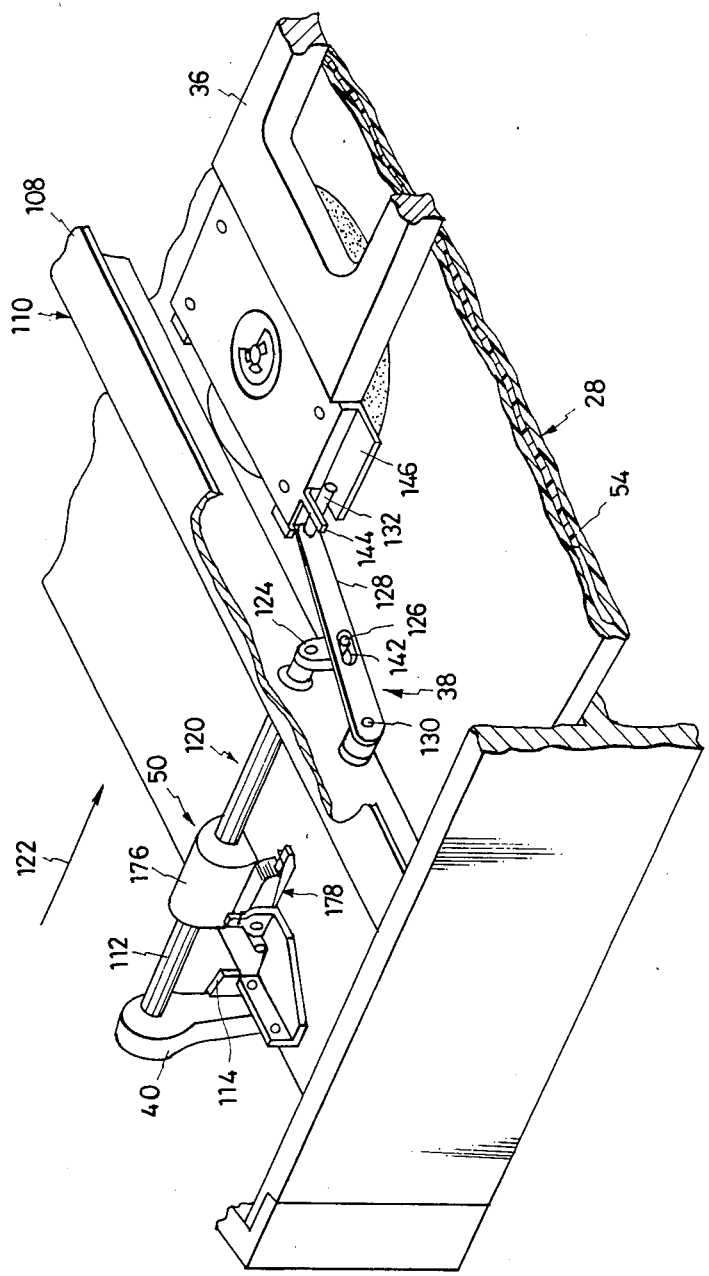
FIG. 9 is also a view similar to FIG. 7 except that the clamp actuating mechanism is shown fully actuated with the consequent travel of the clamp assembly to the clamping position.

Although the clamp actuating mechanism 38 appears in FIG. 1, reference may be had to FIGS. 7 through 9 for a better understanding of its structural and operational details. The clamp actuating mechanism 38 includes the clamp knob or lever 40 seen also in FIGS. 4 and 5. The clamp knob 40 is rigidly mounted at one end of a rotary shaft 112, disposed immediately above the entrance slot 24, for pivotal motion between a disengaging position of FIG. 4 and an engaging position of FIG. 5. When in the disengaging position, the clamp knob 40 is oriented approximately parallel to the entrance slot 24, holding the clamp arm 36 in the unclamping position under the force of the cantilever spring 98 as in FIG. 2. The clamp knob 40 when in this disengaging position allows, of course, the insertion and withdrawal of the disk cartridge 28 into and out of the entrance slot 24.

When turned 90 degrees in a clockwise direction from the disengaging position of FIG. 4 to the engaging position of FIG. 5, the clamp knob 40 causes the clamp arm 36 to pivot from the unclamping to the clamping position against the force of the cantilever spring 98. In this engaging position the clamp knob 40 extends across the entrance slot 24 and so blocks same against the inadvertent forced withdrawal of the disk cartridge 28 or the insertion of another disk cartridge.

As clearly seen in FIG. 7, for instance, the clamp knob 40 has a pusher cam 114 projecting rearwardly, or toward the housing 22, therefrom and generally extending longitudinally of the clamp knob. The pusher cam 114 has a sloping edge 116 and nonsloping edge 118 for direct sliding contact with the trailing edge of the envelope 54 of the disk cartridge 28 being inserted in the entrance slot 24. The pusher cam 114 will serve no useful purpose if the disk cartridge 28 is manually inserted fully into the entrance slot 24, that is, into abutment against the pair of limit stops 78. The user may, however, incompletely insert the disk cartridge 28. Then, upon subsequent manipulation of the clamp knob 40 from the disengaging position of FIG. 4 to the engaging position of FIG. 5, the pusher cam 114 will slidingly engage the partly protruding disk cartridge 28 with its sloping edge 116 and will push same fully into the entrance slot. The nonsloping edge 118 of the pusher cam 14 will function to hold the disk cartridge 28 fully received in the apparatus 20 in the engaging position of the clamp knob 40.

The clamp knob 40 is coupled to the clamp arm 36 via a linkage generally labeled 120. This linkage functions to cause the pivotal motion of the clamp arm 36 between the clamping and unclamping positions in response to the manual activation of the clamp knob 40 between the engaging and disengaging positions. The linkage 120 comprises:

1. The noted rotary shaft 112 having the clamp knob 40 rigidly mounted on its front end and extending in the arrow marked direction 122, FIG. 7, in which the disk cartridge 28 is to be manipulated into and out of the entrance slot 24.

2. A crank web 124 on the rear end of the rotary shaft 112.

3. A crankpin 126 projecting rearwardly from the crank web 124 in an offset relation to the rotary shaft 112.

4. A lever 128 proximally pivoted on a pin 130 affixed to the wall member 110, the lever being further operatively engaged at its midportion with the crankpin 126 and having a pin 132 planted on its distal end for engagement with the clamp arm 36.

The rotary shaft 112 extends through the two confronting portions 134 of the wall member 110, as illustrated in FIG. 1, and is thereby rotatably supported via sleeve bearings 136. The lever 128 has a slot 142, FIGS. 7 through 9, defined longitudinally in its midportion for slidably receiving the crankpin 126 on the crank web 124. Thus, with the manual turn of the clamp knob 40 between the engaging and disengaging positions, the crankpin 126 slides along the slot 142 thereby causing the pivotal motion of the lever 128 in a vertical plane. The slot 142 is longitudinally dimensioned to limit the sliding movement of the crankpin 126 in the engaging and disengaging positions of the clamp knob 40. The pin 132 on the distal end of the lever 128 is operatively engaged between two lateral projections 144 and 146 of the clamp arm 36. These lateral projections are spaced from each other in the thickness direction of the clamp arm 36 and are formed integral with the piece of sheet metal 104 thereon.

As the clamp knob 40 extends horizontally in its disengaging position as in FIGS. 1, 4 and 7, so does the crank web 124 on the rotary shaft 112. Then the crankpin 126 lies at the left hand extremity, as seen in FIG. 7, of the slot 142 in the lever 128, with the result that this lever extends approximately horizontally. The clamp arm 36 is then in the unclamping position of FIG. 2, with its forward extension 106 abutting against the overhang 108 of the wall member 110 under the force of the cantilever spring 98.

The crankpin 126 slides along the slot 142 in the lever 128 with the turn of the clamp knob 40 from the disengaging toward the engaging position. Then, in the engaging position of the clamp knob 40 pictured in FIGS. 5 and 9, the crankpin 126 hits the right hand extremity, as viewed in FIG. 9, of the slot 142. Now the clamp knob 40 and the crank web 124 are both oriented perpendicularly, that is, at right angles with the entrance slot 24. The lever 128 causes the clamp arm 36 to turn from the unclamping to the clamping position, so that the inserted disk cartridge 28 has its magnetic disk 52 caught between clamp assembly 34 and drive hub assembly 30.

Magnetic Transducer Heads

Referring again to FIGS. 2 and 3 in particular, we will briefly explain the magnetic transducer heads 42 and 46 together with means more or less directly associated therewith. The lower transducer head 42 is mounted on the carriage 44 via a gimbal spring 148. The carriage 144 is slidably mounted on a pair of guide rails 150, one seen in FIGS. 2 and 3, extending radially of the magnetic disk of the disk cartridge 28 in its data transfer position, or in the direction in which the disk cartridge is inserted in and withdrawn from the apparatus.

The upper transducer head 46, on the other hand, is mounted to the head arm 48 via a gimbal spring 152. The head arm 48 is hingedly mounted on the carriage 44 via a cantilever spring 154. It is thus seen that both lower 42 and upper 46 transducer heads are movable radially of the magnetic disk of the disk carriage 28 being held in the data transfer position, for accessing the individual tracks on the disk. Adopted for such travel of the transducer heads is an electric head transport motor 156, FIG. 1, having a pinion 158 nonrotatably mounted on its output shaft for driving engagement with a rack 160 attached to the carriage 44. Of course, we could employ other types of rotary to linear converters such as a lead screw or a steel belt wound into the shape of the Greek alpha.

Hingedly mounted as above on the carriage 44, the head arm 48 is pivotable between a retracted position of FIG. 2 and a working position of FIG. 3. When in the retracted position the head arm 48 holds the upper transducer head 46 away from the lower transducer head 42 and, on being pivoted to the working position, urges the upper transducer head against the lower transducer head via the magnetic disk slidably engaged therebetween, with the consequent establishment of data transfer contact between magnetic disk and both transducer heads. We have shown a torsion spring 162 for biasing the head arm 48 from the retracted toward the working position in coaction with the cantilever spring 154. It will be apparent, however, that the head arm 48 could be so biased by only either of the cantilever spring 154 and torsion spring 162.

The head arm 48 has a pin 164 projecting laterally therefrom into an overlying relation with the clamp arm 36, as will be better understood from a consideration of FIG. 1. Thus, when the clamp arm 36 is in the unclamping position of FIG. 2, the head arm 48 lies in the retracted position in opposition to the forces of the springs 154 and 162. When the clamp arm 36 is pivoted to the clamping position of FIG. 3 by the clamp actuating mechanism 38, the head arm 48 is sprung to the working position as shown in the same figure.

As best seen in FIG. 1, a cartridge guide lever 166 extends alongside of the clamp arm 36. This guide lever has a U shaped base portion 168 pivoted on a shaft 170 extending parallel to the guide lever 166. Thus the guide lever 166 is pivotable between a guiding position of FIG. 2, where the disk cartridge 28 on insertion in the entrance slot 24 is guided to the data transfer position so as to avoid collision with the lower transducer head 42, and a nonguiding position of FIG. 3 where the disk cartridge is allowed to make data transfer contact with the lower transducer head. Coiled around the shaft 170, a torsion spring 172 energizes the guide lever 166 from the guiding toward the nonguiding position. The clamp arm 36 has a lug 174 protruding laterally therefrom into an underlying relation with the base portion 168 of the guide lever 166.

It will therefore be seen that when the clamp arm 36 is in the unclamping position as in FIG. 2, the cartridge guide lever 166 is in the guiding position against the force of the torsion spring 172. With the pivotal motion of the clamp arm 36 to the clamping position of FIG. 3, the guide lever 166 is sprung to the nonguiding position.

Clamp Inhibit Mechanism

Figure 10:
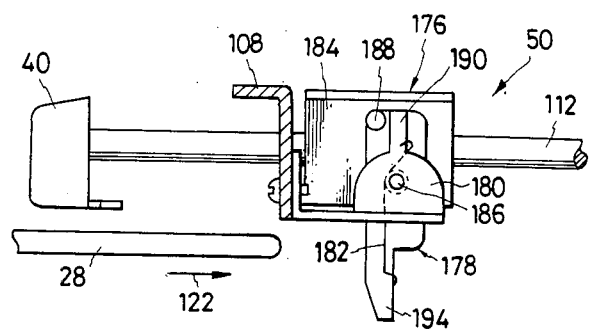
FIG. 10 is a side elevation of the clamp inhibit mechanism, shown in a state when the clamp actuating mechanism is unactuated as in FIG. 7.
Figure 11:
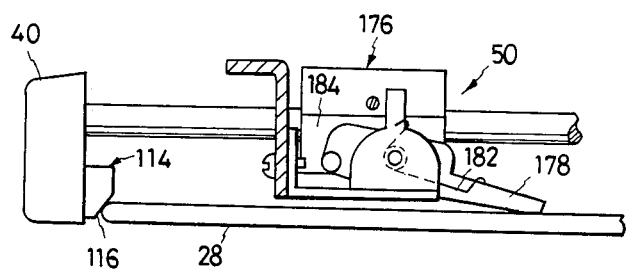
FIG. 11 is a view similar to FIG. 10 except that the clamp inhibit mechanism is shown in a state when the clamp actuating mechanism is partly actuated as in FIG. 8.

Closely associated with the clamp actuating mechanism 38, the clamp inhibit mechanism 50 appears in FIG. 11 but is better illustrated in all of FIGS. 7 through 14. The clamp inhibit mechanism 50 broadly comprises:

1. A cam 176 nonrotatably mounted on the rotary shaft 112 of the clamp actuating mechanism 38.
2. A detent 178 pivotally mounted on a fixed support 180 on the wall member 110 for displacement between a working position of FIGS. 7 and 10 and a retracted position of FIGS. 9 and and 12.
3. A torsion spring 182, FIGS. 10 through 14, for holding the detent 178 in the working position when the disk cartridge 28 is not loaded in the apparatus 20.

We have shown the cam 176 as being approximately semicylindrical in shape, having a flat surface 184 oriented approximately vertically and toward the detent 178 when the clamp knob 40 on the rotary shaft 112 is in the disengaging position as in FIGS. 7 and 10. We will later describe the functions of the cam 176 with its flat surface 184.

Figure 13:
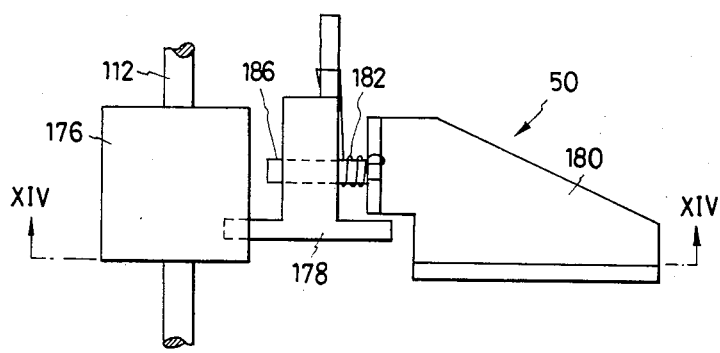
FIG. 13 is a top plan of the clamp inhibit mechanism, shown in the same state as in FIGS. 9 and 12.
Figure 14:
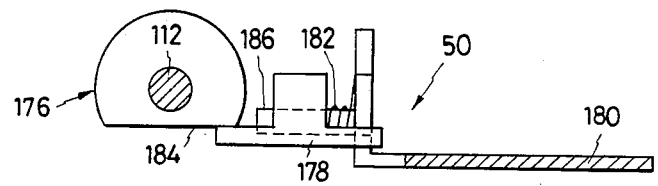
FIG. 14 is a section taken along the line XIV—XIV in FIG. 13 and showing the clamp inhibit mechanism in the same state as in FIGS. 9, 12 and 13.

As will be seen also from FIGS. 13 and 14, the detent 178 is rotatably mounted on a shaft or pin 186 anchored to the fixed support 180. The pin 186 extends at right angles with the arrow marked direction 122 in which the disk cartridge 28 is inserted in and withdrawn from the apparatus 20. Sleeved upon the pin 186, the torsion spring 182 urges the detent 178 in a clockwise direction, as viewed in FIGS. 10 through 12, thereby holding the detent in the working position of FIGS. 7 and 10 when the disk cartridge 28 is not loaded in the apparatus 20. The detent 178 stays in the working position as its protuberance 188 butts on a limit stop 180 formed integral with the fixed support 180.

Figure 12:
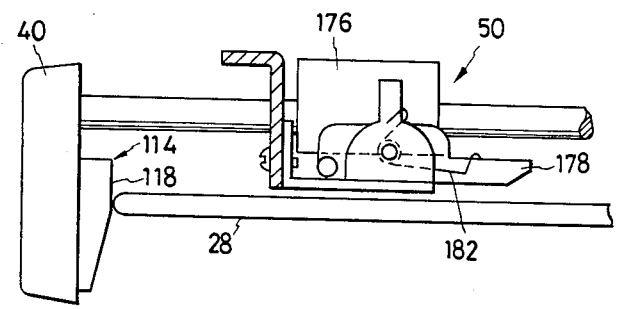
FIG. 12 is also a view similar to FIG. 10 except that the clamp inhibit mechanism is shown in a state when the clamp actuating mechanism is fully actuated as in FIG. 9.

Also forming parts of the detent 178 are another protuberance 192 extending toward the cam 176, and a feeler arm 194 depending therefrom across the predetermined path of the disk cartridge 28 from the entrance slot 24 to the data transfer position within the housing 22. The protuberance 192 of the detent 178 serves both as an abutment and as a cam follower. The detent protuberance as an abutment will be abutted upon by the cam 176 when the user attempts to turn the clamp knob 40 toward the engaging position when the disk cartridge 28 is not loaded in the apparatus 20, as best shown in FIG. 7. As a cam follower, then, the protuberance 192 will again be acted upon by the cam 176 as in FIGS. 8 and 9 to cause full retraction of the feeler arm 194 away from the path of the disk cartridge 28 to the position depicted in FIGS. 11 and 12, against the force of the torsion spring 182 when the clamp knob 40 is turned to the engaging position following the loading of the disk cartridge 28. The depending feeler arm 194 is to be hit by the disk cartridge 28 upon insertion thereof in the entrance slot 24, thereby to cause angular displacement of the detent 178 from its FIGS. 7 and 10 position to that of FIGS. 8 and 11. The subsequent angular displacement of the detent 178 from its FIGS. 8 and 11 position to that of FIGS. 9 and 12 is to be effected as the cam 176 acts on the detent protuberance 192.

Operation

We have illustrated the data transfer apparatus 20 and its clamp inhibit mechanism 50 in FIGS. 1, 2, 4, 7 and 10 in a state wherein the disk cartridge 28 is not loaded and the clamp knob 40 unactuated, and in FIGS. 3, 5, 9, and 12 through 14 in a state wherein the disk cartridge is loaded and clamped between clamp assembly 34 and drive hub assembly 30.

When the clamp knob 40 is in the disengaging position as in FIGS. 1, 4, 7 and 10, the clamp arm 36 is in the unclamping position of FIG. 2 under the force of the cantilever spring 98. Although energized toward the working position of FIG. 3 by the springs 154 and 162, the head arm 48 stays in the retracted position of FIG. 3 as the pin 164 projecting laterally therefrom rests on the clamp arm 36 being held in the unclamping position as above. The cartridge guide lever 166 is now held in the guiding position of FIG. 2 by the lug 174 on the clamp arm 36 against the force of the torsion spring 172.

The user may tamper with the clamp knob 40, attempting to turn same toward the engaging position, when the disk cartridge 28 is not loaded in the apparatus 20. Then the flat surface 184 of the cam 176 of the clamp inhibit mechanism 50 will butt against the protuberance 192 of the detent 178, as will be best understood from FIG. 7. Being mounted on the shaft 186 at right angles with the rotary shaft 112 on which the cam 176 is mounted, the detent 178 will stay in the FIG. 7 position in the face of the force exerted thereon from the cam. Consequently, the clamp knob 40 is then positively locked against rotation toward the engaging position. As the rotation of the clamp knob is thus prevented, so is the travel of the upper transducer head 46 into direct contact with the lower transducer head 42. Both transducer heads 42 and 46 as well as their gimbal supports 148 and 152 are thus protected against destruction from tampering with the clamp knob 40.

The user may insert the disk cartridge 28 in the entrance slot 24 as indicated by the arrow 122 in FIGS. 7 and 10. The disk cartridge 28 will first come into engagement with the depending feeler arm 194 of the detent 178. Pushed by the disk cartridge 28, the detent 178 will pivot against the bias of the torsion spring 182 from the working position of FIGS. 7 and 10 to an intermediate position of FIGS. 8 and 11, short of the retracted position of FIGS. 9 and 12. The detent 178 when in this intermediate position will have its feeler arm 194 riding over the inserted disk cartridge 28, and its protuberance 192 displaced to a position against a lower portion of the flat surface 184 of the cam 176. With its protuberance 192 thus displaced, the detent 178 will no longer prevent the rotation of the cam 176 with the clamp knob 40 from the disengaging position of FIGS. 7 and 10 toward the engaging position of FIGS. 9 and 12.

The inserted disk cartridge 28 will travel over the cartridge guide lever 166 being held in the guiding position of FIG. 2 by the clamp arm 36. The cartridge guide lever 172 when in this guiding position functions to guide the disk cartridge 28 toward the data transfer position so as not to hit the lower transducer head 42. The collision of the disk cartridge with the lower transducer head is particularly undesirable because it, as well as the upper transducer head 46, is gimbal supported in the illustrated embodiment of our invention.

The user may turn the clamp knob 40 from the disengaging to the engaging position following the insertion of the disk cartridge 28. He may have failed to fully insert the disk cartridge, leaving a certain trailing end portion thereof projecting out of the entrance slot 24. If the length of this projecting end portion of the disk cartridge is less than a limit determined by the shape, size and position of the pusher 114 on the clamp knob 40, the disk cartridge will become loaded fully by the subsequent manipulation of the clamp knob from the disengaging to the engaging position, as the sloping edge 116 of the pusher slidingly engages and pushes the cartridge into the apparatus 20, as will be best understood from FIG. 11. The nonsloping edge 118 of the pusher 114 will serve to hold the disk cartridge fully received in the apparatus, as illustrated in FIG. 12.

With the turn of the clamp knob 40 from the disengaging to the engaging position, the crankpin 126 on the crankweb 124 will slide from one extremity of the slot 142 in the lever 128 to the other thereby causing the lever 128 to pivot through the required angle about the pin 130. The pin 132 on the distal end of the lever 128 will then act on the lower lateral projection 146 of the clamp arm 36 to force same from the unclamping position of FIG. 2 to the clamping position of FIG. 3 against the force of the cantilever spring 98.

Toward the end of the clamp knob turn from the disengaging to the engaging position, the cam 176 on the rotary shaft 112 will act on the protuberance 192 of the detent 178, causing same to pivot from the intermediate position of FIGS. 8 and 11 to the retracted position of FIGS. 9 and 12 against the effect of the torsion spring 182. Thus, in the engaging position of the clamp knob 40, and therefore in the retracted position of the detent 178, the feeler arm 178 is completely out of contact with the loaded disk cartridge 28, as best shown in FIG. 12.

In the clamping position of the clamp arm 36 the conical collet 88 of the clamp assembly 34 will become engaged in the socket 84 in the drive hub 80 through the central aperture 58, FIG. 6, in the flexible magnetic disk 52 of the loaded disk cartridge 28. Further the exposed annular portion 60 of the magnetic disk 52 will become captured between the annular surface 86 of the drive hub 80 and the flange 90 on the collet 88. At the same time with such engagement of the magnetic disk 52 between drive hub assembly 30 and clamp assembly 34, the clamp arm 36 on its travel to the clamping position will allow the cartridge guide lever 166 to pivot from the guiding position of FIG. 2 to the nonguiding position of FIG. 3 under the bias of the torsion spring 172. Thus is the magnetic disk 52 clamped in the data transfer position.

Still further, upon pivotal motion of the clamp arm 36 to the clamping position, the head 48 will pivot from the retracted position of FIG. 2 to the working position of FIG. 3 under the forces of the springs 154 and 162. As the upper transducer head 46 thus makes data transfer contact with the upper face of the magnetic disk 52, so does the lower transducer head 42 with the lower face of the magnetic disk.

The transfer of data between disk cartridge 28 and transducer heads 42 and 46 can now be initiated by imparting rotation to the disk by the disk drive motor 32. Having been retracted to the FIGS. 9 and 12 position by the cam 176, the feeler arm 194 of the detent 178 will not in any way interfere with the rotation of the magnetic disk 52 within the envelope 54.

Alternate Form

Figure 15:
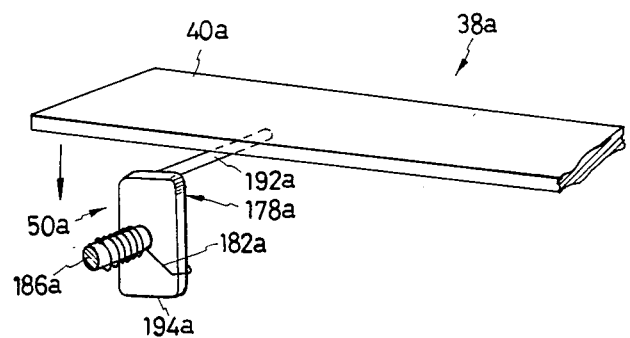
FIG. 15 is a perspective view of an alternative form of the clamp actuating mechanism and clamp inhibit mechanism in accordance with our invention.
Figure 16:
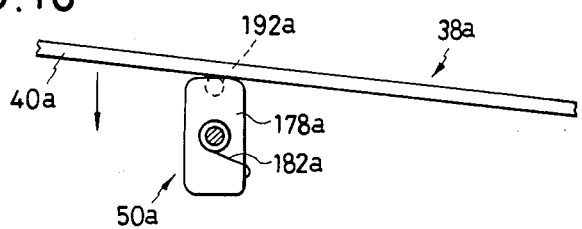
FIG. 16 is a side elevation of the alternative clamp actuating mechanism and clamp inhibit mechanism of FIG. 15, shown in a state when the clamp actuating mechanism is unactuated to hold the clamp assembly in the unclamping position.
Figure 17:
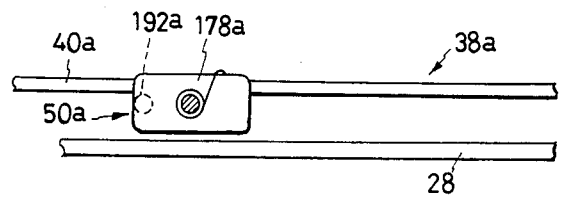
FIG. 17 is a view similar to FIG. 16 except that the clamp actuating mechanism is shown fully actuated for clamping the loaded disk cartridge.

In FIGS. 15 through 17 we have shown an alternative clamp actuating mechanism 38a together with an alternative clamp inhibit mechanism 50a. The clamp actuating mechanism 38a has a clamp lever 40a which can be a forward extension of the clamp arm 36 of the preceding embodiment. The clamp lever 40a may be manipulated between the positions of FIGS. 16 and 17 for pivoting the clamp arm between the unclamping and clamping positions.

The clamp inhibit mechanism 50a includes a detent 178a rotatable on a shaft 186a between the working position of FIGS. 15 and 16 and a retracted position of FIG. 17. A torsion spring 182a energizes the detent 178a from the retracted toward the working position. The detent 178a has a pin 192a protruding from one end portion thereof into an underlying relation with the clamp lever 40a. The other end portion 194a of the detent 178a functions as a feeler, extending across the path of the disk cartridge from the entrance slot in the housing to the data transfer position therein when the detent is in the working position.

When the disk cartridge is not loaded in this apparatus, the detent 178a is in the working position of FIGS. 15 and 16 under the bias of the torsion spring 182a. The pin 192a on the detent 178a underlies the clamp lever 40a to prevent its activation toward the engaging position. Upon insertion of the disk cartridge in the entrance slot, the detent 178a will be angularly displaced against the bias of the torsion spring 182a to a position intermediate the working position of FIGS. 15 and 16 and the retracted position of FIG. 17 as the disk cartridge presses its end portion 194a. With the detent 178a thus displaced to the intermediate position, the clamp lever 40a can be depressed to clamp the loaded disk cartridge, thereby simultaneously causing the further angular displacement of the detent to the retracted position of FIG. 17 against the force of the torsion spring 182a. The detent is now spaced from the loaded disk cartridge 28.

Possible Modifications

Although we have shown and described our invention in terms of but two embodiments thereof, we recognize, of course, that our invention is not to be limited by the exact details of this disclosure. A variety of modifications and alterations will readily occur to one skilled in the art within the broad teaching hereof. The following is a brief list of such possible modifications:

1. The clamp assembly need not be moved into and out of engagement with the drive hub assembly by the clamp knob 40, clamp lever 40a, or any other hand operated means. An obvious alternative to such hand operated means is a solenoid or electric motor, which will both make possible the pushbutton actuation of the clamp assembly.

2. In the first described embodiment of our invention, the cam 176 functions not only as such but also to lock the clamp knob 40 against rotation in coaction with the detent 178. Separate members might of course be provided for these two functions.

3. The flat surface 184 of the cam 176 might be reduced in size to an extent required to butt on the protuberance 192 of the detent 178 when the clamp knob 40 is turned without previously loading the disk cartridge in the apparatus. The other part of the cam 176 may be suitably contoured to act on the detent 178 for pivoting same to the retracted position.

4. That part of the cam surface 184 to act on the detent 178 for pivoting same to the retracted position might be recessed, or made closer to the axis of the rotary shaft 112 than the other part of the cam surface which is to butt on the detent.

All these and other alterations of the invention are intended in the foregoing disclosure; therefore, our invention is to be limited only by the terms of the claims which follow.

We claim:

1. A data transfer apparatus for use with a magnetic disk cartridge having a magnetic disk rotatably enclosed in an apertured, protective envelope, the data transfer apparatus comprising:
   (a) a housing having an entrance opening for the insertion and withdrawal of the disk cartridge to and from a predetermined data transfer position therein;
   (b) a drive hub assembly rotatably mounted within the housing in a concentric relation with the magnetic disk of the disk cartridge when the latter is in the data transfer position, the drive hub assembly being effective to impart rotation to the magnetic disk;
   (c) a clamp assembly disposed on the opposite side of the disk cartridge in the data transfer position with respect to the drive hub assembly;
   (d) a clamp actuating mechanism for actuating the clamp assembly between an unclamping position, where the clamp assembly is away from the drive hub assembly to allow the insertion and withdrawal of the disk cartridge into and from the housing, and a clamping position where the clamp assembly engages between itself and the drive hub assembly the magnetic disk of the disk cartridge in the data transfer position, the clamp assembly when in the clamping position being rotatable jointly with the magnetic disk and the drive hub assembly about a common axis;
   (e) a first transducer head arranged on one side of the magnetic disk of the disk cartridge in the data transfer position;
   (f) a carriage having the first transducer head mounted thereon for transporting same radially of the magnetic disk of the disk cartridge in the data transfer position;
   (g) a second transducer head arranged on the opposite side of the disk cartridge in the data transfer position with respect to the first transducer head;
   (h) a head arm having the second transducer head mounted thereon and itself pivotally mounted on the carriage for movement between a retracted position, where the second transducer head is away from the disk cartridge in the data transfer position, and a working position where the second transducer head urges the magnetic disk of the disk cartridge against the first transducer head for the establishment of data transfer contact of the magnetic disk with both first and second transducer heads, the head arm being associated with the clamp actuating mechanism so as to be held in the retracted position when the clamp assembly is in the unclamping position and to be held in the working position when the clamp assembly is in the clamping position; and
   (i) a clamp inhibit mechanism having a detent for preventing the clamp actuating mechanism from actuating the clamp assembly from the unclamping to the clamping position when the disk cartridge is not loaded in the housing, the detent being activated by the disk cartridge inserted in the entrance opening in the housing for allowing the clamp actuating mechanism to actuate the clamp assembly from the unclamping to the clamping position, the detent being further displaced out of contact with the loaded disk cartridge in response to the actuation of the clamp assembly from the unclamping to the clamping position by the clamp actuating mechanism whereby the clamped magnetic disk can be rotated by the drive hub assembly without being in any way impeded by the detent.

2. The data transfer apparatus as set forth in claim 1, further comprising:
   (a) a clamp arm pivotally mounted to a stationary part of the housing and having the clamp assembly rotatably mounted thereto; and
   (b) resilient means acting on the clamp arm for biasing the clamp assembly from the clamping toward the unclamping position;

(c) the clamp actuating mechanism being effective to pivot the clamp arm against the bias of the resilient means for actuating the clamp assembly from the unclamping to the clamping position.

3. The data transfer apparatus as set forth in claim 2, wherein the clamp actuating mechanism comprises:
(a) a clamp knob pivotally mounted to the housing, in the immediate proximity of the entrance opening therein, for manual activation between an engaging position for the engagement of the magnetic disk of the disk cartridge between the clamp assembly and the drive hub assembly and a disengaging position for the disengagement of the magnetic disk therefrom, the clamp knob blocking the entrance opening when in the engaging position and being held off the entrance opening when in the disengaging position; and
(b) a linkage operatively connecting the clamp knob to the clamp arm for causing the latter to move the clamp assembly from the unclamping to the clamping position against the bias of the resilient means upon activation of the clamp knob from the disengaging to the engaging position and for causing the clamp arm to move the clamp assembly from the clamping to the unclamping position under the bias of the resilient means upon activation of the clamp knob from the engaging to the disengaging position.

4. The data transfer apparatus as set forth in claim 3, wherein the linkage of the clamp actuating mechanism comprises a rotary shaft rotatably supported by the housing and having the clamp knob rigidly mounted thereon for bidirectional rotation as the clamp knob is pivoted between the engaging and disengaging positions, and wherein the clamp inhibit mechanism comprises:
(a) a cam mounted on the rotary shaft for joint rotation therewith;
(b) the detent being disposed adjacent the cam for displacement between a working and a retracted position, the detent when in the working position being engageable with the cam so as to prevent the rotation of the rotary shaft in a direction to allow the manipulation of the clamp knob from the disengaging toward the engaging position;
(c) second resilient means for holding the detent in the working position when the disk cartridge is not loaded in the apparatus;
(d) a feeler forming a part of the detent and extending across a predetermined path of the disk cartridge from the entrance opening in the housing to the data transfer position therein when the detent is in the working position, the feeler thoroughly receding away from the path of the disk cartridge upon displacement of the detent from the working to the retracted position against the force of the second resilient means, the feeler being hit by the disk cartridge, as the latter is inserted in the entrance opening, and being thereby diplaced in a direction away from the path of the disk cartridge only to such an extent that the detent comes to a position intermediate the working and retracted positions;
(e) the cam on the rotary shaft being adapted to act, when the clamp knob is manipulated from the disengaging to the engaging position following the loading of the disk cartridge in the apparatus, on the detent to cause the displacement thereof from the intermediate to the retracted position;
(f) whereby the feeler of the detent moves out of contact with the loaded disk cartridge upon clamping of the magnetic disk.

5. The data transfer apparatus as set forth in claim 4, wherein the detent is supported for rotation between the working and retracted positions about an axis at right angles with the direction in which the disk cartridge is inserted in and withdrawn from the apparatus.

6. The data transfer apparatus as set forth in claim 3, further comprising a pusher cam formed on the clamp knob for pushing the disk cartridge, if incompletely inserted in the entrance opening in the housing, fully into the housing upon activation of the clamp knob from the disengaging to the engaging position.

7. The data transfer apparatus as set forth in claim 2, wherein the clamp actuating mechanism comprises a clamp lever substantially forming an extension of the clamp arm and adapted to be manipulated for pivoting the clamp are between the clamping and unclamping positions, and wherein the detent of the clamp inhibit mechanism is rotatably supported adjacent the clamp lever for displacement between a working and a retracted position, the detent when in the working position being engageable with the clamp lever so as to prevent the clamp arm from being pivoted from the unclamping toward the clamping position, the clamp inhibit mechanism further comprising:
(a) second resilient means for holding the detent in the working position when the disk cartridge is not loaded in the apparatus; and
(b) a feeler forming a part of the detent and extending across a predetermined path of the disk cartridge from the entrance opening in the housing to the data transfer position therein when the detent is in the working position, the feeler thoroughly receding away from the path of the disk cartridge upon displacement of the detent from the working to the retracted position against the force of the second resilient means, the feeler being hit by the disk cartridge, as the latter is inserted in the entrance opening, and being thereby displaced in a direction away from the path of the disk cartridge only to such an extent that the detent comes to a position intermediate the working and retracted positions;
(c) the clamp lever when manipulated for pivoting the clamp arm from the unclamping to the clamping position following the loading of the disk cartridge in the apparatus acting on the detent to cause the displacement thereof from the intermediate to the retracted position;
(d) whereby the feeler moves out of contact with the loaded disk cartridge upon clamping of the magnetic disk.

8. The data transfer apparatus as set forth in claim 2, further comprising a cartridge guide lever pivotally mounted within the housing and operatively engaged with the clamp arm for movement between a guiding position, where the disk cartridge on insertion through the entrance opening in the housing is guided to the data transfer position so as to avoid collision with the first transducer head, and a nonguiding position where the disk cartridge is allowed to make data transfer contact with the first transducer head, the cartridge guide lever being held in the guiding position when the clamp assembly is in the unclamping position, and being pivoted to the nonguiding position upon movement of the clamp assembly to the clamping position.

* * * * *